March 3, 1953
S. KONGELBECK
2,630,133
RATE OF FLOW REGULATOR
Filed Jan. 31, 1947
2 SHEETS—SHEET 1
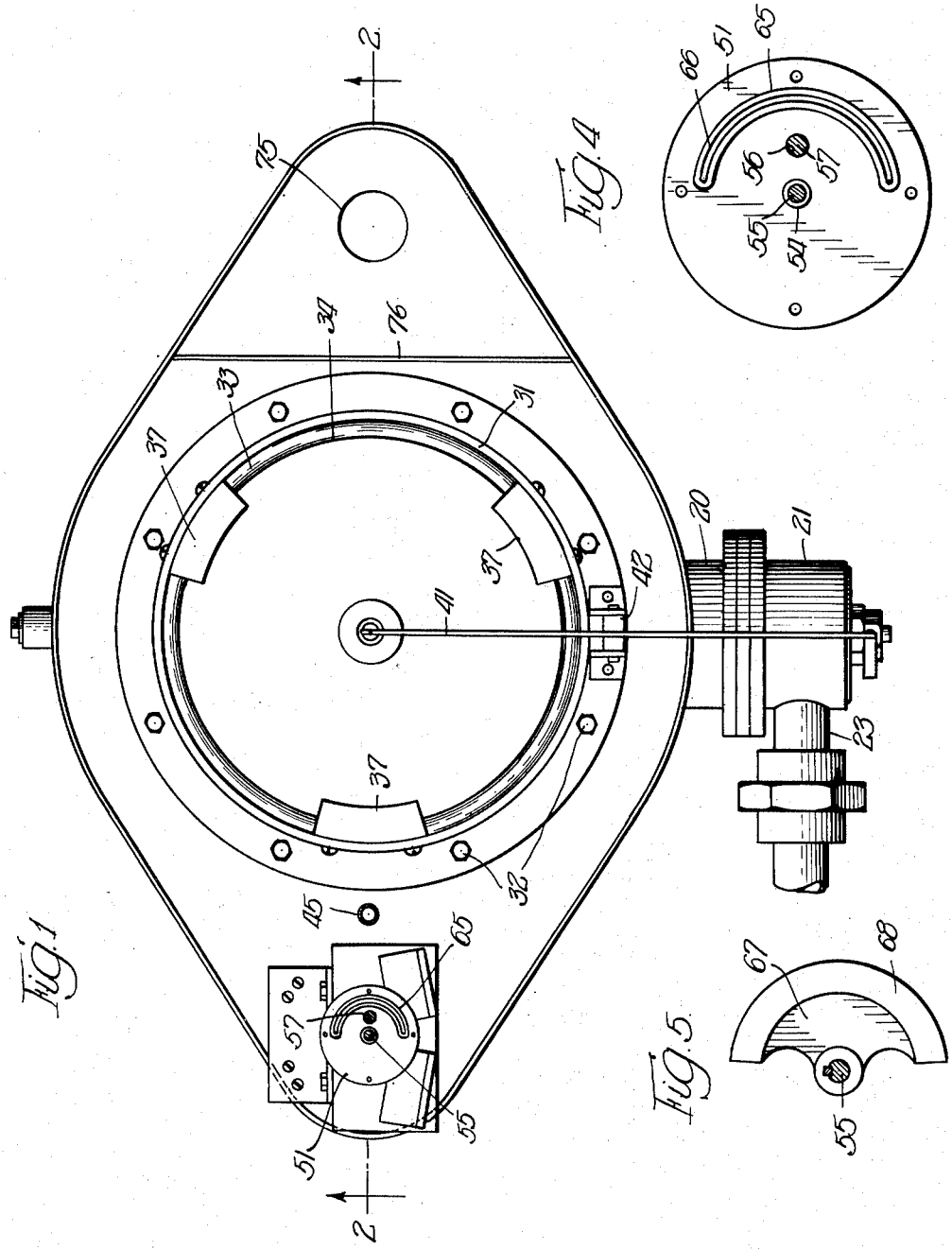
INVENTOR.
Sverre Kongelbeck,
BY Robyn Wilcox
ATTY.

March 3, 1953 — S. KONGELBECK — 2,630,133
RATE OF FLOW REGULATOR
Filed Jan. 31, 1947 — 2 SHEETS—SHEET 2
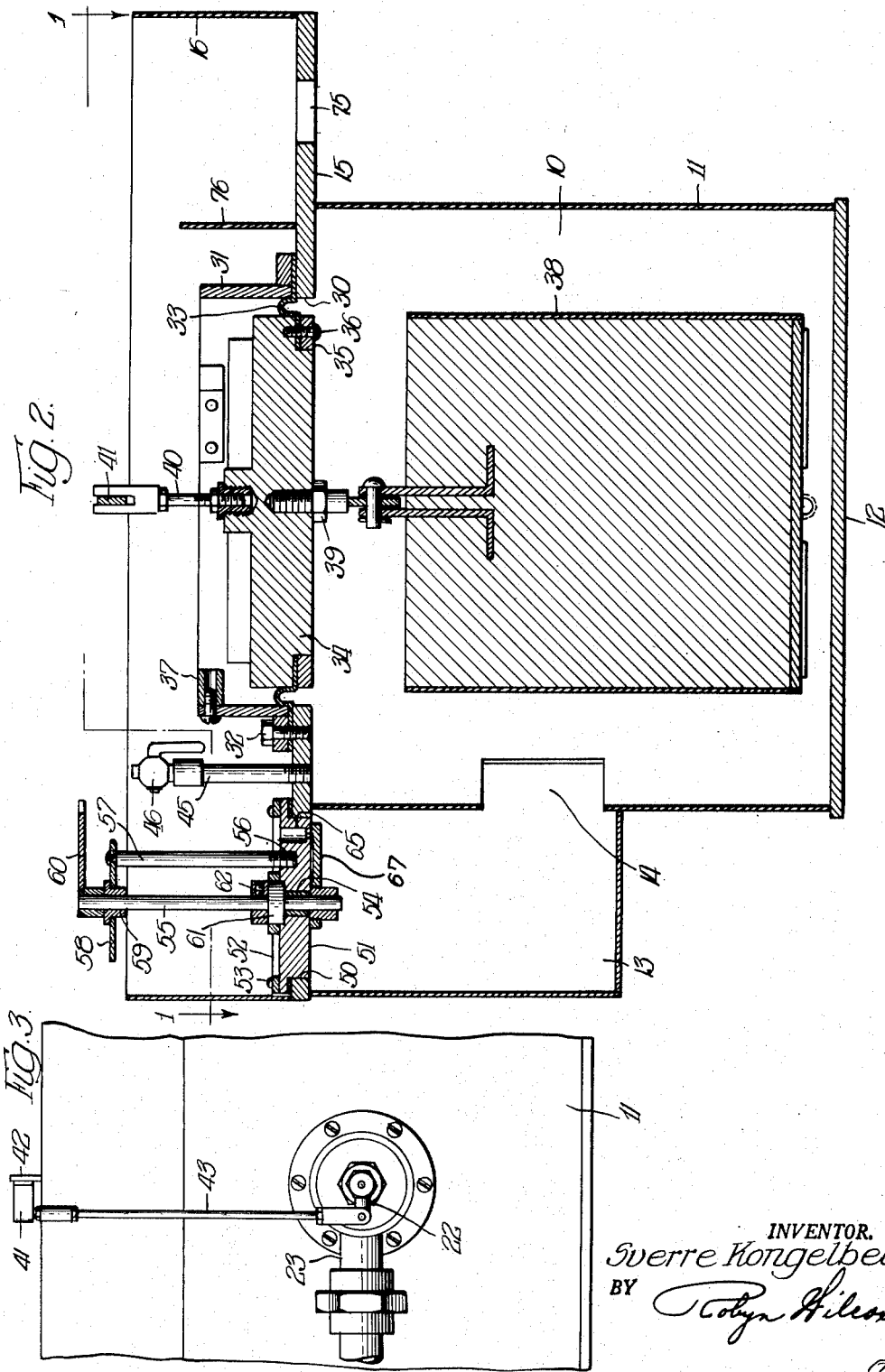
INVENTOR.
Sverre Kongelbeck,
BY
ATTY.

Patented Mar. 3, 1953

2,630,133

UNITED STATES PATENT OFFICE 2,630,133

RATE OF FLOW REGULATOR

Sverre Kongelbeck, Chicago, Ill., assignor to Infilco Incorporated, Chicago, Ill., a corporation of Delaware Application January 31, 1947, Serial No. 725,645

11 Claims. (Cl. 137—505)

1

This invention relates to a rate of flow regulator particularly adapted to maintain predetermined rates of flow regardless of fluctuations in the head of the liquid whose flow is to be controlled, and is directed specifically to means for maintaining a constant head upon the flow control orifice irrespective of wide and rapid fluctuations in line pressure.

A primary object of this invention is to provide an improved rate of flow regulator, and one which is immediately responsive to variations in line pressure and acts to maintain a constant head on the discharge orifice.

Another important object of the present invention is to provide a rate of flow regulator or controller which is accurately adjustable over a wide range of flows and pressures, and provides an accurate flow regardless of wide and rapid fluctuations in line pressure.

Another object of this invention is to provide a more compact rate of flow controller and one which avoids use of the customary Venturi tube or similar pressure creating devices.

These and other objects of the invention will be apparent from the description and claims which follow.

It is a basic principle of hydraulics that the rate of discharge of fluid through an orifice varies with the pressure, or head, loss across the orifice. Heretofore it has been customary to build a rate of flow regulator, or controller, on the principle of varying the size of the orifice (flow control valve) from variations in a pressure differential across a pressure differential creating device (such as a Venturi tube). In such constructions an actuator, customarily a diaphragm of one kind or another, received the high and low pressures, and was loaded to operate against a predetermined pressure differential, and movement of the diaphragm was used to position the flow control valve. Such structures required considerable pressure differentials in order to operate the mechanism. Such structures are very satisfactory for large plants, such as municipal water works, where extreme accuracy is not necessary and where flows are large and do not fluctuate rapidly. However such structures are not satisfactory for controlling relatively small flows, and they cannot be used where space requirements are such that use of bulky equipment is impossible. Neither are such structures readily adaptable to installations where it is desired to readily change the setting of the device, such as by the customary low voltage telemetering equipment, as the old flow con-

2 trollers often were extremely difficult to set and in many cases required manual settings to vary the loading on the diaphragm.

My invention relates to an improved rate of flow regulator which is small in size, is particularly adapted to control relatively small flows, which can be accurately and conveniently set by ordinary telemetering devices, and which is extremely accurate over an extremely wide range of flows from completely closed to wide open positions. To secure such improved results I operate upon the principle of setting the discharge orifice to desired positions, the variation in size varying from changes in the positioning device, and automatically maintaining the pressure on the upstream side of the orifice uniform in spite of variations in the line pressure leading to the orifice. Thus in my device the rate of discharge is readily adjustable by positioning the valve structure associated with the discharge orifice (which can be, and preferably is, adjusted in cross sectional area according to the linear movement of the valve positioning means). There is associated with such valve structure an automatic mechanism to maintain a constant head on the discharge orifice. Such a structure provides an immediately responsive device, readily adjusted to meet desired changes in rate of flow, and automatically responsive to wide and extreme variations in line pressure.

In connection with my device it is preferred that the discharge orifice and the actuating diaphragm be submerged in the same body of liquid so that any variation in the head on the downstream side of the discharge orifice will always be compensated for by a corresponding variation in the head over the diaphragm, thus maintaining a constant pressure drop across the discharge orifice.

Briefly the apparatus of my invention comprises a closed inlet chamber, one side of which chamber (preferably the top) is a weighted diaphragm, an inlet into the inlet chamber having a valve positioned by movement of the diaphragm, an adjustable outlet orifice from said chamber and a weir providing a common head of liquid over the orifice and over the diaphragm.

The apparatus of my invention will be more readily understood by reference to the drawings in which:

Figure 1 is a top view of a preferred form of my regulator, taken along the horizontal planes indicated by the lines 1—1 of Figure 2;

Figure 2 is a vertical cross sectional view of the same form of regulator, taken along the vertical plane indicated by the line 2—2 of Figure 1;

Figure 3 is a side view of the inlet valve operating mechanism;

Figure 4 is a preferred form of discharge orifice; and

Figure 5 is a preferred form of valve, or orifice, plate.

The apparatus of my invention comprises a pot or basin 10 of suitable size and shape, but which is shown in the figures as being cylindrical in shape and having side wall 11 and bottom 12. In one apparatus which I have heretofore made and used, the pot or basin 10, which will sometimes be referred to herein as the inlet, or constant pressure, chamber, had a diameter of about 15 inches and a height of about 13 inches, and was suitable to control flows in which line pressure varied up to 45 pounds per square inch and in which rates of flow ranged from .5 to 13.5 gallons per minute. The size and shape of the inlet chamber 10, however, is not important but can vary as desired to meet flow requirements, pressure ranges, space limitations, or the like. Mounted on one side of the basin 10 is an outlet chamber or pot 13, the two chambers being in constantly open communication through a passageway 14. Mounted on the top of the inlet chamber 10 and the outlet chamber 13 is a cover plate 15 which is enclosed by an upstanding side wall 16, as shown. Preferably the inlet chamber 10, the outlet chamber 13, cover plate 15 and the side wall 16 will be of steel construction welded together to form a sturdy and water tight pressure chamber, although it will be understood that neither the type of material used nor the method of fastening these parts together is critical.

Mounted on another portion of the side wall 11 of the inlet chamber 10 is the inlet connection 20, which is provided with a readily adjustable flow control valve 21, the valve 21 being positioned by movement of lever or arm 22 (shown in Figure 3). An inlet water line 23 is connected to the inlet valve 21.

The cover plate 15 is provided with a circular opening 30 axially aligned with the inlet chamber 10. Associated with the circular opening 30 is a flanged clamping ring 31 adapted to be removably attached to the cover plate 15 by any suitable means such as bolts 32. A flexible diaphragm 33 is clamped between the cover plate 15 and the clamping ring 31, the inner portion of the diaphragm being attached to a diaphragm center plate 34 by any suitable means such as clamping ring 35 held by studs 36. Preferably the clamping ring 31 will be provided with stops 37 which limit the upward movement of the diaphragm plate 34. In most installations it will also be desired to attach a weight 38 to the diaphragm plate 34 by any suitable means, such as hanger 39. It will be obvious that the total weight of the center plate 34, the weight 38 and hanger 39 will be calculated to fit the pressures and flows to be encountered in the installation, and can be readily computed by those skilled in the art.

Rising from the center of the diaphragm plate 34 is standard 40 at the upper end of which is pinned a lever 41. The lever 41 is fulcrumed on a second standard or fulcrum 42, which is preferably mounted on the cover plate 15. The outer end of the lever 41 is pinned to the upper end of an adjustable connecting link 43, the lower end of which is pinned to arm 22 that positions the inlet valve 21. The inlet valve 21 is so set that it is closed upon raising of the center plate 34 and opened when the plate drops. When the diaphragm is raised to its extreme position the inlet valve should be completely closed and when it drops to its lowermost position it should be fully opened. It will thus be obvious that if the pressure in the inlet line 23 increases, the amount of liquid entering through the inlet valve 21 will tend to increase correspondingly. As the outlet, hereafter to be described, restricts the flow from the chamber, the increase of flow thereinto will cause an increase in the pressure therein. This increase in pressure in the inlet chamber 10, which occurs immediately on an increase in pressure in the supply line 23, causes the diaphragm 33 to move upward to throttle the inlet valve 21 an amount sufficient to restore the proper pressure in the inlet chamber 10. It is obvious that by so maintaining a constant pressure in the inlet chamber 10, the effective head across the outlet orifice will remain constant, and thus the flow therethrough will also be constant. Similarly, if the line pressure drops, the amount of liquid entering the inlet chamber 10 will also decrease, thus causing a decrease in pressure therein and permitting the diaphragm to drop, thereby opening the inlet valve an amount to maintain the pressure in the inlet chamber at the predetermined figure. Thus variations in the supply, or line, pressure (in pipe 23) causes a momentary change in pressure and volume in the inlet, or constant pressure chamber, 10, which causes the diaphragm 33 to position the inlet valve 21. The diaphragm 33 operates in response to pressure changes to vary the volume in the chamber, and thus operates to maintain a uniform pressure in the chamber 10. There are slight differences in the actual pressure in the chamber 10 between various settings of the outlet orifice, but for any particular setting, the diaphragm will maintain a constant pressure in the inlet chamber 10.

Preferably the inlet chamber 10 will be provided with an air vent 45 provided with a suitable cock 46.

The cover plate 15 is also provided with an opening 50 over the outlet chamber 13. Associated with the opening 50 is an orifice plate 51, a preferred form of which is shown in enlarged detail in Figure 4. As shown in the drawing in Figure 2 one suitable way of holding the orifice plate 51 in the desired position is through means of a clamping ring 52 which is bolted to the cover plate 15 by any suitable means such as machine screws 53. The orifice plate 51 is provided with a centrally located vertical bearing 54 in which is rotatably mounted a positioning shaft 55. The upper surface of the orifice plate 51 is also provided with a threaded socket 56, in which is threaded a guide standard 57. A bracket 58 containing a bearing 59, which encircles the shaft 55, is mounted on the upper end of guide standard 57, thereby holding the shaft in a true vertical position. The shaft may be rotated by any suitable means such as lever arm 60, which may be operated manually or by some suitable telemetric operating device, not shown. A packing gland 61, held into position by any suitable means such as collar 62, prevents leakage of water through bearing 54.

The orifice plate 51 contains a suitable orifice, which preferably takes the form of an arcuate slot 65, as is shown in Figure 4. Preferably the upper portion of the arcuate slot 65 will be relatively large while a smaller orifice 66 is cut through a relatively thin portion of the plate. Associated with the orifice 65, and preferably mounted on the underside of the orifice plate 51, is a valving member 67, one form of which is shown in enlarged detail in Figure 5. The valving member may comprise a semi-circular plate keyed to the shaft 55. Preferably, the peripheral portion 68 of the plate 67 will be raised and machined so as to afford a substantially water-tight fit against the lower side of the orifice plate 51 immediately adjacent the orifice 66, as shown in Figure 2. Obviously, in order to provide for the opening of the orifice 66 from zero to full open positions, it is necessary that the orifice be less than a half circle. It is also desirable that the orifice be relatively long so that sensitive adjustments of the orifice plate will be effective to produce an appreciable change in rate of flow. I have found that a slot subtending an arc of about 162 degrees is well adapted for these purposes. Thus rotation of the valving plate 67, which will preferably subtend an arc of slightly more than the arc of the orifice, will position the valve plate to provide a free orifice of any desired size between a fully closed to fully open position. It is obvious that rotation of the shaft 55 readily varies the opening, or size, of the orifice 65, and that the size of the opening is a linear function of the angular movement of the lever 60, thus providing a more readily adjustable discharge orifice.

The upper open chamber formed on top of the cover plate 15 by the side walls 16 is provided with an outlet 75, preferably located at the end of the cover plate 15 opposite the outlet chamber 13, as shown. Adjacent the outlet 75 is a sharp crested weir 76 preferably rising to a level above that of the flanged clamping ring 31. The weir 76 should be of sufficient length to carry the maximum flow of water. The use of the weir 76 is preferred in order to submerge the orifice 65. The submerging of the orifice 65 not only smothers the effect of a jet flow through the orifice, but a common head of liquid is maintained in the upper open chamber over the orifice and the diaphragm. Thus movement of the diaphragm 33 and the center plate 34 does not affect the difference in liquid head across the orifice 65. Further, the amount of head over the orifice and the diaphragm does not affect the pressure drop across the submerged orifice. Thus neither the position of the diaphragm, nor the head over the orifice, can affect the head across the discharge orifice. While the error arising from an unsubmerged diaphragm and orifice might be slight, it is necessary to avoid such discrepancies in highly accurate measurements, to which my apparatus is directed.

It is believed that operation of my apparatus is obvious from the description preceding. The cross sectional area of the outlet orifice 65 is adjusted by rotation of the shaft 55, the cross sectional area preferably varying in direct proportion to the angle of rotation of the shaft 55. The diaphragm 33 operates to position the inlet valve 21 so that for any setting of the orifice plate 67 a constant pressure is maintained in the chambers 10 and 13 regardless of the line pressure in the supply conduit 23. Similarly, at any rate of flow, there is maintained a constant head on the downstream side of the orifice 65 and also above the diaphragm 33. By maintaining a constant pressure drop across the orifice 65 the flow through the orifice will be constant, at any one setting of the orifice plate 67, regardless of pressure in the inlet line 23 and regardless of the position of the diaphragm plate. It is obvious that variations in supply pressure will vary the inflow of liquid into the constant pressure chamber as long as the opening of the inlet remains unchanged. However, the diaphragm constitutes a volume responsive, pressure regulating member which prevents variation in supply pressure from changing the pressure on the discharge orifice. Also, the pressure in the chamber is determined by the loading of the diaphragm weight, but not by its position or any depth of liquid over the orifice. Thus the apparatus of my invention provides a rate of flow regulator which maintains a constant head across the discharge orifice under all conditions and also provides an adjustable orifice which can readily be set by any preferred means, and which would be accurate over a very wide range of supply pressures.

Manifestly many modifications of my invention can be made by those skilled in the art. Accordingly the appended claims are to be given an interpretation commensurate with the scope of this invention and as broad as may be permitted by the prior art.

I claim:

1. A rate of flow regulating device comprising a pressure chamber, an inlet into said chamber, a discharge orifice from said chamber, and means for maintaining the pressures on both sides of said orifice constant, said means including a weighted diaphragm in said pressure chamber, a valve in said inlet and connected to, and positioned by, said diaphragm, and a constant level liquid holding chamber at the discharge side of said orifice.

2. A rate of flow regulating device comprising a pressure chamber, an inlet to said pressure chamber, a valve in said inlet, a pressure responsive member attached to a wall of said chamber, a loading member in said chamber and attached to said pressure responsive member, means operatively connecting said pressure responsive member to said valve and so arranged as to position said valve in accordance with the position of said pressure responsive member, a discharge orifice from said chamber, means for adjusting the size of the discharge orifice, and means for maintaining a constant head of liquid on the discharge side of said orifice.

3. A rate of flow regulating device comprising a pressure chamber, an inlet to said chamber, a valve in said inlet, a flexible member forming a part of the enclosing walls of said chamber, said valve being operatively connected to, and positioned by movement of, said flexible member, a discharge orifice from said chamber, means for adjusting the size of the discharge orifice, a wall joined to and extending from said pressure chamber, said wall forming with a wall of said pressure chamber a second chamber on the outlet side of said discharge orifice, an outlet from said second chamber, and means for maintaining a predetermined liquid level in said second chamber.

4. A rate of flow regulating device comprising a casing, an inlet into said casing, a valve in said inlet, a weighted diaphragm in the top of said casing, linkage operatively connecting said diaphragm to said inlet valve and so constructed and arranged as to close said valve upon raising of the diaphragm, an orifice from said casing, a valving plate associated with said orifice, means for moving said valving plate with respect to said orifice, and means for maintaining a constant head of liquid on the downstream side of said orifice and said diaphragm.

5. A rate of flow regulating device comprising a casing, an inlet into said casing, a valve in said inlet, a weighted diaphragm in the top of said casing, linkage operatively connecting said diaphragm to said inlet valve and so constructed and arranged as to throttle said valve upon raising of the diaphragm, an orifice opening from said casing, a valving plate associated with said orifice, means for moving said valving plate with respect to said orifice, a wall joined to and extending from said casing and enclosing said orifice and said diaphragm, said wall forming together with a wall of said casing a chamber on the outlet side of said orifice, and an overflow from said chamber.

6. A rate of flow regulating device comprising a casing having an inlet and an outlet chamber in open communication with each other, an inlet into said inlet chamber, a valve in said inlet, a weighted diaphragm in the top of said inlet chamber, linkage operatively connecting said diaphragm to said inlet valve and so constructed and arranged as to throttle said valve upon raising of the diaphragm, an orifice in the top of said outlet chamber, a valving plate associated with said orifice, means for moving said valving plate with respect to said orifice, a wall on the top of said casing forming an upper chamber enclosing said diaphragm and said orifice, an outlet from said upper chamber, and a weir separating said outlet from said orifice and said diaphragm.

7. The apparatus of claim 3 wherein the said second chamber surrounds both the said discharge orifice and the said flexible member.

8. The apparatus of claim 3 wherein said means for maintaining a predetermined liquid head in said second chamber comprises a wall structure interposed between said discharge orifice and the outlet from said second chamber.

9. A rate of flow regulating device comprising a pressure chamber, an inlet into said chamber, a valve in said inlet, a member responsive to changes in pressure in said chamber and connected to said valve so as to move said valve in valve closing direction upon an increase in pressure in said chamber and in valve opening position upon a decrease in pressure in said chamber, a discharge orifice from said chamber, and means for maintaining a constant pressure drop across said orifice.

10. A rate of flow regulating device comprising a pressure chamber, an inlet to said pressure chamber, a valve in said inlet, means for varying the opening of said valve conversely proportional to changes in the inlet pressure, said means including a member movable upon variations in pressure in said pressure chamber and operatively connected to said valve, a discharge orifice from said chamber, and means for maintaining a constant head over the discharge side of said orifice.

11. A rate of flow regulating device comprising a pressure chamber, an inlet to said pressure chamber, a valve in said inlet, a diaphragm associated with, and positioned by pressure in, said chamber, linkage operatively connecting said diaphragm to said valve so as to move said valve in valve closing direction upon an increase in pressure in said chamber and in valve opening direction upon a decrease in pressure therein, a discharge orifice from said chamber, means for adjusting the size of the discharge orifice, and means for maintaining a substantially constant head on the outlet side of said orifice, said means including a second chamber beyond said orifice.

SVERRE KONGELBECK.

REFERENCES CITED

The following references are of record in the file of this patent:

UNITED STATES PATENTS

| Number | Name | Date |
|---|---|---|
| 324,905 | Westinghouse | Aug. 25, 1885 |
| 371,324 | Hyams | Oct. 11, 1887 |
| 482,842 | Harris | Sept. 20, 1892 |
| 2,091,482 | McCreary | Aug. 31, 1937 |
| 2,258,485 | Everson | Oct. 7, 1941 |
| 2,343,375 | Herman | Mar. 7, 1944 |